United States Patent [19]
Shimizu et al.

[11] Patent Number: 5,740,780
[45] Date of Patent: Apr. 21, 1998

[54] CONTROL SYSTEM FOR IMPROVED CYLINDER TORQUE BALANCE OF ENGINE

[75] Inventors: Hirokazu Shimizu; Kenichi Machida, both of Gunma, Japan

[73] Assignee: Unisia Jecs Corporation, Atsugi, Japan

[21] Appl. No.: 795,851

[22] Filed: Feb. 5, 1997

[30] Foreign Application Priority Data

Feb. 5, 1996 [JP] Japan .................................. 8-019017

[51] Int. Cl.⁶ .................................................. F02B 5/14
[52] U.S. Cl. .................................................. 123/425
[58] Field of Search ........................ 123/425; 364/431.08

[56] References Cited

U.S. PATENT DOCUMENTS

| | | | |
|---|---|---|---|
| 5,488,868 | 2/1996 | Ootake et al. | 73/708 |
| 5,503,007 | 4/1996 | Plee et al. | 73/116 |
| 5,508,927 | 4/1996 | Remboski et al. | 364/431.08 |
| 5,535,722 | 7/1996 | Graessley et al. | 123/425 |
| 5,546,905 | 8/1996 | Fukui | 123/425 |
| 5,632,247 | 5/1997 | Hashizume et al. | 123/425 |
| 5,645,034 | 7/1997 | Entenmann et al. | 123/425 |

FOREIGN PATENT DOCUMENTS 63-17432  2/1988  Japan ...................... 123/425

OTHER PUBLICATIONS

"Guide for Nissan Cefiro of the A32 Type Series", published in Japan in Aug. 1994 by Nissan Motor Co., Ltd., pp. 18, 38–44, 56–58.

"Guide for Nissan Cedric Gloria of the Y33 Type Series" published in Japan in Jun. 1996 by Nissan Motor Co., Ltd.

*Primary Examiner*—Raymond A. Nelli
*Attorney, Agent, or Firm*—Foley & Lardner

[57] ABSTRACT

Cylinder to cylinder variation in developed cylinder torque is suppressed by correcting ignition timings for the individual cylinders or by correcting fuel injection amounts allocated to the individual cylinders. Amounts of correction to be made to the individual ignition timings or fuel injection amounts are determined as results of comparison of individual cylinder pressure averages with a multiple cylinder pressure average that is an average of the individual cylinder pressure averages.

12 Claims, 16 Drawing Sheets

5,740,780

CONTROL SYSTEM FOR IMPROVED CYLINDER TORQUE BALANCE OF ENGINE

BACKGROUND OF THE INVENTION

The present invention relates to a control system for an engine with electronic control to optimize engine operation for improved cylinder torque balance.

It is known to adjust air fuel ration or ignition timing for engine operation near the limit of stable engine operation. Specifically, fuel control to increase air fuel ration of combustible mixture distributed to all cylinders or ignition timing control to retard ignition timing of the cylinders are carried out based on cylinder pressures to keep torque variation rate not to exceed an engine stable operation limit.

It is conceivable to conduct such controls on cylinder to cylinder basis for cylinder operation with increased air fuel ratio or at more retarded ignition timing. In the case where there are cylinder to cylinder variations in lean limit and retard limit, cylinder to cylinder variations in air fuel ratio and ignition timing are brought about, impairing cylinder torque balance.

An object of the present invention is to an engine control system with precision but simple control to reduce cylinder to cylinder torque variations to improve torque balance.

SUMMARY OF THE INVENTION

According to one aspect of the present invention, there is provided a control system for cylinder torque balance of an internal combustion engine including multiple cylinders, comprising:

means for determining individual cylinder torque having been developed by the cylinders of the engine;

means for calculating, out of the determined individual cylinder torque, a multiple cylinder average; and means for controlling a control variable on which individual cylinder torque depends in such a manner as to decrease a deviation of the determined individual cylinder torque from the determined multiple cylinder average.

According to another aspect of the present invention, there is provided a control method for cylinder torque balance of an internal combustion engine including multiple cylinders, comprising the steps of:

determining individual cylinder torque having been developed by the cylinders of the engine;

calculating, out of the determined individual cylinder torque, a multiple cylinder average; and controlling a control variable on which individual cylinder torque depends in such a manner as to decrease a deviation of the determined individual cylinder torque from the determined multiple cylinder average.

Specifically, there is provided according to the present invention an improved control unit means for an ignition timing control system for an internal combustion engine including a plurality of spark plugs for cylinders of the engine, respectively, the plurality of spark plugs providing sparks in response to individual spark timing commands, and control unit means for developing the individual spark timing commands.

The control unit means inputs information of cylinder pressure within each of the engine cylinders over crank angles about top dead center (TDC) over a predetermined number of cycles.

The control unit means determines, for each of the cylinders, a ratio, as a developed torque parameter, between integral of cylinder pressure over a predetermined angle after top dead center and integral of cylinder pressure over a predetermined crank angle before top dead center.

The control unit means calculates integral of said determined developed torque parameter over said predetermined number of cycles and calculates an individual cylinder average for each of the cylinders.

The control unit means calculates a multiple cylinder average out of said individual cylinder averages of the cylinders.

The control unit means compares each of said individual cylinder averages with said multiple cylinder average.

The control unit means determines correction amounts to the ignition timing commands in response to results of comparing each of said individual cylinder averages with said multiple cylinder average, respectively.

DETAILED DESCRIPTION OF THE INVENTION

Figure 1:
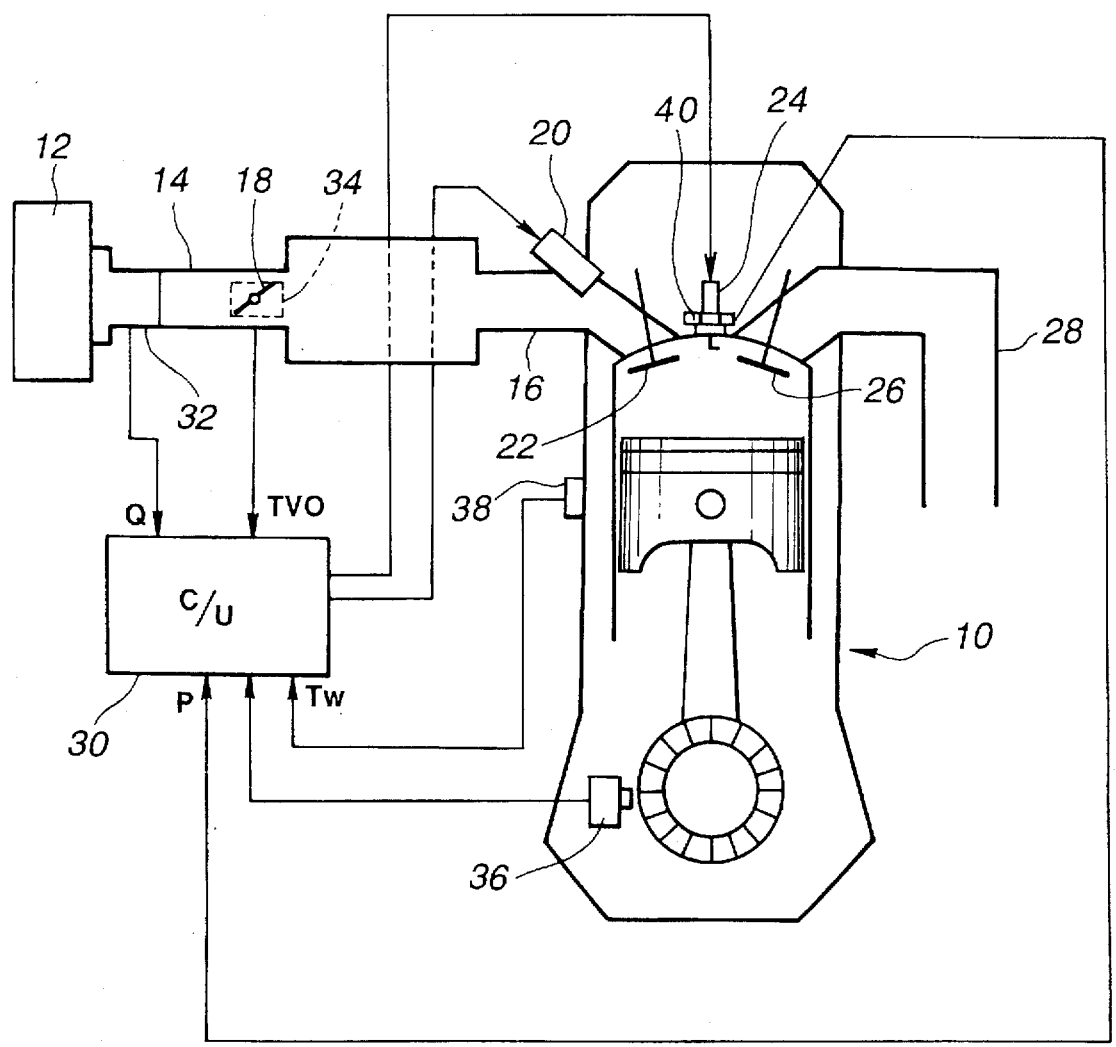
FIG. 1 is a diagram illustrating a control system for improved cylinder torque balance of a multiple cylinder internal combustion engine.

Referring to FIG. 1, a four-stroke internal combustion engine is generally designated by the reference numeral 10. The engine 10 has four cylinders, namely, No. 1 cylinder No. 2 cylinder, No. 3 cylinder and No. 4 cylinder, in this embodiment. In FIG. 1, for the sake of simplicity, the No. 1 cylinder is illustrated as representative of each of the cylinders of the engine 10. Intake air is admitted to the engine 10 through an air cleaner 12, an air induction duct 14 and an intake manifold 16.

Disposed within the air induction duct 14 is a throttle valve 5 which opens in degrees by a gas pedal or an accelerator, not shown. Flow of air admitted to the engine can be regulated by the throttle valve 5.

The intake manifold 16 includes four branches extending toward the four cylinders, respectively. Four fuel injection valves, only one being shown at 20, are arranged to direct jets of fuel into the four branches, respectively. With electronic control, amount of fuel to be injected by each of the fuel injection valves 20 can be adjusted independently, so that different air fuel mixtures may be formed in the cylinders, respectively, if desired.

During induction stroke, while an inlet valve 22 is open, a descending piston draws fresh air fuel mixture into one of the cylinders. During compression stroke, while both inlet and exhaust valves 22 and 26 are closed, the rising piston compresses the mixture. Then, the mixture is ignited by a spark plug 24. During power stroke, while the valves 22 and 26 are closed, the pressure of the gases of combustion forces the piston downwards. During exhaust stroke, the exhaust valve 26 is open and the rising piston discharges the spent gases from the cylinder. The gases discharged pat the exhaust valve 26 are directed by an exhaust manifold 28 toward a catalytic converter and then to a muffler, not shown.

Electronic controls to optimize amount of fuel injection and ignition timing are carried out by a control unit 30. The control unit 30 includes a microcomputer including a central processor unit (CPU), a read only memory (ROM), a random access memory (RAM), an input interface unit and an output interface unit.

An air flow meter of the hot wire type 32 is provided for measuring flow rate of intake air upstream of the throttle valve 18 and provides as an output an intake air flow rate signal Q indicative of the measured flow of air passing through the air induction duct 14 upstream of the throttle valve 18. A throttle sensor 34 is provided for measuring throttle opening degree in which the throttle valve 18 opens and provides as an output a throttle valve opening degree signal TVO indicative of the measured throttle opening degree. With this throttle sensor 34, it can be determined whether or not the engine 10 is idling by comparing the current sensor output with a minimum value of stored data of sensor output during previous engine operation. If desired, a throttle sensor incorporating idle contacts may be provided. In this case, it can be determined that the engine is idling by checking whether or not the idle contacts are closed. A crankshaft angle sensor 36 is provided for measuring crankshaft angle and provides as an output a crankshaft angle signal CA indicative of the measured crankshaft angle. A water temperature sensor 38 is provided for measuring temperature of water for the engine and provides as an output a water temperature signal Tw indicative of the measured water temperature. Cylinder pressure sensors, only one being shown at 40, are provided for measuring pressures within the cylinders, respectively. Each of the cylinder pressure sensors provides as an output a cylinder pressure signal P indicative of the measured cylinder pressure. All of the outputs are fed to the control unit 30.

The air flow meter 32 generates, as the air flow signal Q, electric voltage proportional to the flow of air passing through the air induction duct 14. The throttle sensor 34 is in the form of a potentiometer. The crankshaft angle sensor 36 includes a magnetic type reference (REF) sensor, a magnetic type position (8) sensor and a magnetic type phase (PHASE) sensor. The REF and POS sensors are provided to detect position of a crankshaft of the engine 10, while the PHASE sensor is provided to detect position of a camshaft of the engine 10. The REF sensor includes a signal plate attached to or integral with a crank pulley connected to the crankshaft for unitary rotation therewith. The POS sensor includes a signal plate attached to or integral with a flywheel for a manual transmission or to a drive plate for an automatic transmission. The PHASE sensor includes a signal plate attached to or integral with a primary crankshaft sprocket. The REF sensor is provided to detect a reference position of each of the cylinders, i.e., a position predetermined degrees before the top dead center (TDC) of the piston in the cylinder. Specifically, the REF sensor generates a REF signal at the reference position upon every rotation of the crankshaft through a predetermined angle, for example 180 degrees for the four cylinders. The POS sensor generates a POS signal upon every rotation of the crankshaft through 1 (one) degree. The PHASE sensor generates a PHASE signal at such a rate that number of occurrence of PHASE signal within an interval between one and the subsequent occurrences of REF signal represents cylinder number whose ascending piston is about to reach TDC immediately after the subsequent occurrence of REF signal. In determining engine speed Ne, number of occurrence of POS signal for a unit time is counted. Alternatively, number of occurrence of REF signal may be counted for a unit time to determine engine speed Ne. In identifying cylinder number, number of occurrence of PHASE signal is counted. The water temperature sensor 38 employs a thermistor having resistor that varies with temperature of the water. The air flow meter 32, throttle sensor 36, cranking angle sensor 36 and water temperature sensor 38 are described on pages B-18, B-38, B-56 to B-58 of a guide book entitled "GUIDE FOR NISSAN CEFIRO OF THE A32 TYPE SERIES" published in Japan in August 1994 by Nissan Motor Co., LTD. On page B-18 of this guide book, there are described a crank pulley within an integral signal plate of a REF sensor, a flywheel integral with a signal plate of a PCS sensor, and a drive plate integral with a signal plate of a POS sensor. On page 5–38 of the guide book, there is described a crankshaft angle sensor composed of a REF sensor, a POS sensor and a PHASE sensor. On Page B-56 of the guide book, there are photographs of the REF sensor and POS sensor with brief explanations. On page B-57 of the guide book, there are photographs of the PHASE sensor, an air flow meter and a water temperature with brief explanations. On Page B-58 of the guide book, there is a photograph of a throttle sensor.

The cylinder pressure sensors 40 are arranged to all of the cylinders, respectively. Each of them includes a washer of piezoelectric material used as a washer of the corresponding one spark plug 24. The cylinder pressure sensor of this type is disclosed in JP-A 63-17432 U. For brevity, further explanation of cylinder pressure is omitted. Of course, other type of pressure sensor may be used, such as a cylinder pressure directly detecting cylinder pressure within the cylinder.

Based on information derived from the REF, POS and PHASE signals of the crankshaft angle sensor 36, the water temperature signal Tw of the water temperature sensor 38 and the output of the throttle sensor 34, the control unit 30 determines current engine speed, water temperature and throttle opening degree. For determining an ordinary ignition timing, the control unit 30 performs a table look-up operation of an appropriate map based on the determined engine speed, water temperature and throttle opening degree. This operation results in giving a base ignition timing which is a major term of an equation used for calculating the ordinary ignition timing. This equation includes various correction terms in addition to the major term. The control unit 30 determines the correction terms and calculates this equation to determine the ordinary ignition timing. The control unit 30 is connected with each of ignition coils at a built-in power transistor thereof. The ignition coils are directly coupled with all of the spark plugs 24, respectively. The ignition coil of the above mentioned type is known and disclosed on page B-111 of a guide book entitled "GUIDE FOR NISSAN CEDRIC GLORIA OF THE Y33 TYPE SERIES" published in Japan in June 1996 by Nissan Motor Co., Ltd.

Among the correction terms of the equation, there is a knocking correction term. The control unit 30 receives information of cylinder pressure in each of the cylinders from outputs of all of the cylinder pressure sensors 40 to process the information to find which one of the cylinders experienced knocking, if occurred, and modify the knocking correction factor allocated to this cylinder to retard the ordinary ignition timing therefor.

The ignition timing system mentioned above is well known and described on pages B-43 and B-44 of the guide book entitled "GUIDE FOR NISSAN CEFIRO OF THE A32 TYPE SERIES".

Based on information derived from the REF, POS and PHASE signals of the crankshaft angle sensor 36, the air flow rate signal Q of the air flow meter 32, the water temperature signal Tw the water temperature sensor 38 and the output of the throttle sensor 34, control to optimize fuel injection is carried out. Ordinary fuel injection amount Ti, i.e., injection pulse width, is expressed as, $$Ti = 2 \times Te \times Ts \qquad \text{Eq. 1}$$

where:

Te is effective fuel injection amount; and

Ts is correction for compensating for drop of battery voltage.

The effective fuel injection amount Te is expressed as, $$Te = Tp \times Co \qquad \text{Eq. 2}$$

where:

Tp is base fuel injection amount; and

Co is genus correction coefficient which is a function of various species correction coefficients provided for smooth engine operation over various operation modes.

The base fuel injection amount Tp is expressed as, $$Tp = K \times Q/Ne \qquad \text{Eq. 3}$$

where:

K is constant;

Q is flow rate of air passing through air flow meter 32; and

Ne is engine speed.

The control unit 30 performs a torque balance control of the engine wherein ignition timings and/or fuel injection amounts to individual cylinders are corrected.

Figure 2:
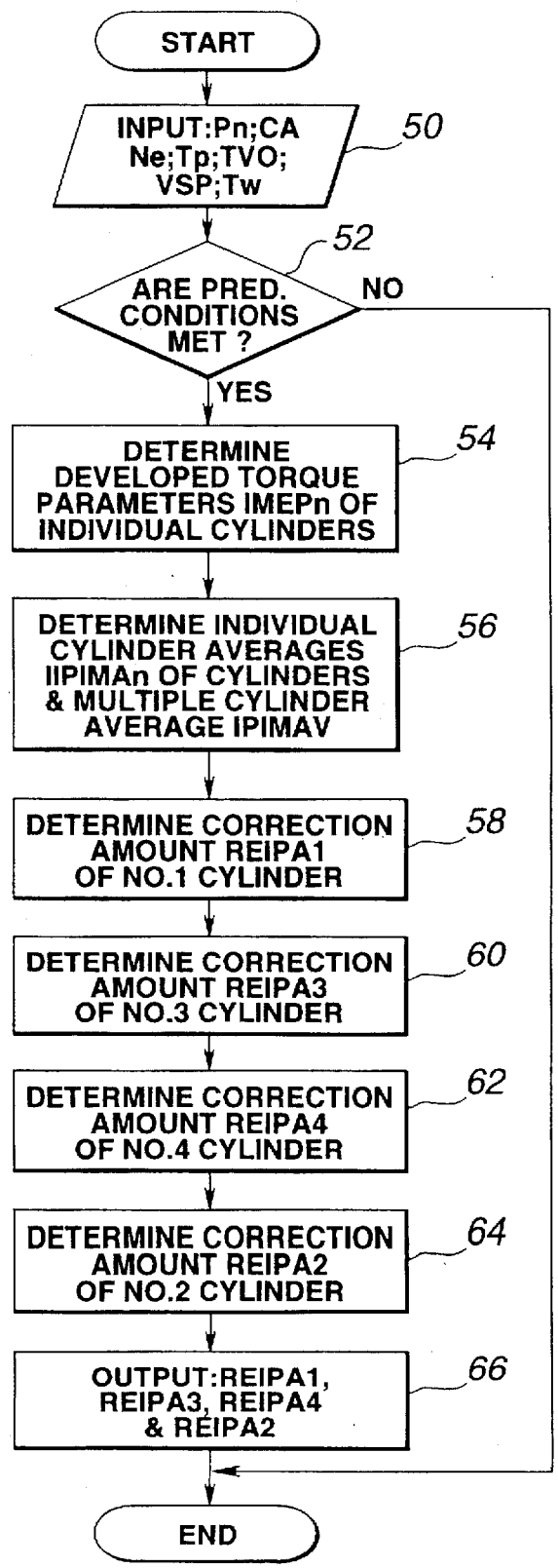
FIG. 2 is a flowchart of a main routine illustrating a preferred implementation of a control strategy according to the present invention.

The flowchart of FIG. 2 illustrates a simplified routine of the preferred implementation of the present invention. In step 50, the control unit 30 inputs information of cylinder pressure Pn (n=1, 2, 3, 4) within individual cylinders of the engine, crank angle CA, engine speed Ne, base fuel injection amount Tp as variable representing engine load, throttle valve opening TVO, vehicle speed VSP and engine water temperature Two. In step 52, the control unit 30 determines whether or not predetermined conditions appropriate for the torque balance control are met. In the case where the predetermined conditions are not met, the control unit 30 does not perform the torque balance control. Preferably, the torque balance control should be permitted when the engine operates in stable state or idles and when there occurs no misfire in any of the engine cylinders. Occurrence of misfire or non-occurrence of misfire may be detected by comparing combustion pressure as derived from output of the cylinder pressure sensor 40 and a slice level variable with varying combinations of engine load Tp and engine speed Ne.

If the predetermined conditions are found to be met in step 52, the control unit 30 executes job in step 54. In step 54, the control unit 30 determines developed torque parameter IMEPn (n=1, 2, 3, 4) for each of the engine cylinders. IMEPn can be expressed as, $$IMEPn = IMEPna - IMEPnb \qquad \text{Eq. 4 or}$$

$$IMEPn = IMEPna/IMEPnb \qquad \text{Eq. 5}$$

where:

IMEPn is developed torque parameter as a result of combustion within the nth cylinder;

IMEPnb results from time integration of cylinder pressure P within the nth cylinder from 120 degrees before top dead center (BTDC) to top dead center (TDC); and IMEPna results from time integration of cylinder pressure P within the nth cylinder from TDC to 120 degrees after top dead center (ATDC).

Figure 4:
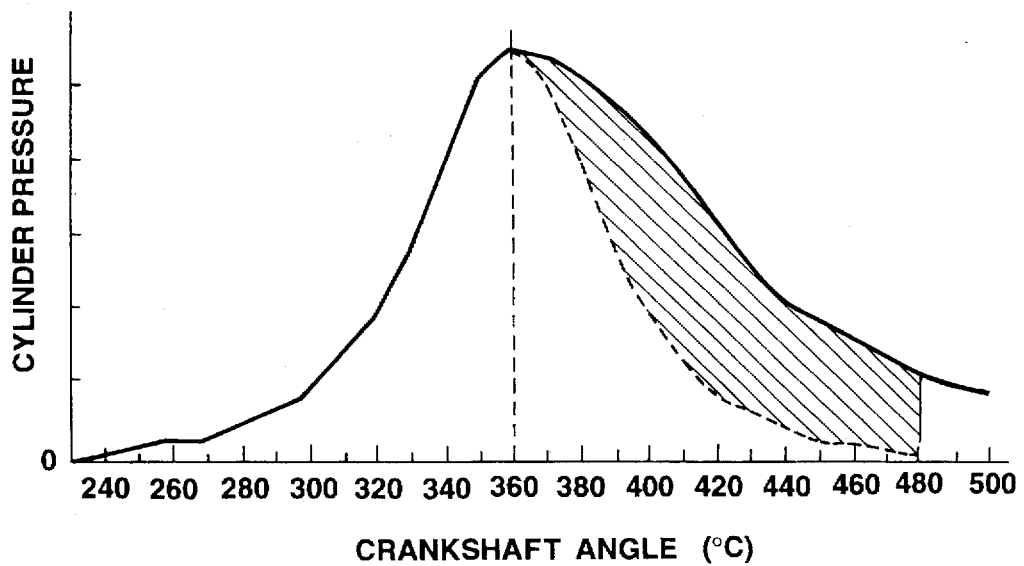
FIG. 4 is a graphical representation of cylinder pressure (P) versus crankshaft angle during compression and power phases.

FIG. 4 illustrates varying cylinder pressure P within the nth cylinder from 120 degrees BTDC to 120 degrees ATDC. In this Figure, IMEPn is expressed as an area of shadowed zone. It may be noted that the range of integration is not limited by 120 degrees BTDC and 120 degrees ATDC.

IMEPnb may be given as a result of summation of measurements of cylinder pressure P within the nth cylinder at regular crank angle intervals, for example 1 degree, over range from 120 degrees BTDC to TDC. Similarly, IMEPna may result from summation of measurements of cylinder pressure P with the nth cylinder at regular crank angle intervals, for example 1 degree, over range from TDC to 120 degrees ATDC.

In control with less precision, IMEPn may be approximated by IMEPna.

In step 56, the control unit 30 calculates integration IMESUn of IMEPn (suffix n represents cylinder number) for each of the cylinders. Specifically, the control unit 30 increments IMESUn by IMEPn (IMESUn=IMESUn+IMEPn) upon completion of one cycle of the nth cylinder over a predetermined number (IPASMP) of cycles. Also performed in this step 56 are calculation of average of IMEP for each of the cylinders. This average IPIMAn, hereinafter called as individual cylinder average, is expressed by the following equation:

$$IPIMAn = IMESUn/IPASMP \qquad \text{Eq. 6}$$

where:

IPIMAn is individual cylinder average of nth cylinder (suffix n represents a cylinder number);

IPASMP is predetermined number of cycles; and

IMESUn is integration of IMEPn over IPASMP.

With results, namely, IPIMA1, IPIMA3, IPIMA4, and IPIMA2, the control unit 30 calculates an average of IMEP over all of the cylinders. This average IPIMAV, which is hereinafter called as multiple cylinder average, is expressed by the following equation:

$$IPIMAV = (IPIMA1 + IPIMA3 + IPIMA4 + IPIMA2)/4 \qquad \text{Eq. 7}$$

where:

IPIMAV is the multiple cylinder average;

IPIMA1 is individual cylinder average of number 1 cylinder;

IPIMA3 is individual cylinder average of number 3 cylinder;

IPIMA4 is individual cylinder average of number 4 cylinder; and

IPIMA2 is individual cylinder average of number 2 cylinder.

With multiple cylinder average IPIMAV and individual cylinder average IPIMA1, the control unit 30 determines, in step 58, a correction amount REIPA1 of ignition timing for No. 1 cylinder.

With multiple cylinder average IPIMAV and individual cylinder average IPIMA3, the control unit 30 determines, in step 60, a correction amount REIPA3 of ignition timing for No. 3 cylinder.

With multiple cylinder average IPIMAV and individual cylinder average IPIMA4, the control unit 30 determines, in step 62, a correction amount REIPA4 of ignition timing for No. 4 cylinder.

With multiple cylinder average IPIMAV and individual cylinder average IPIMA2, the control unit 30 determines, in step 64, a correction amount REIPA2 of ignition timing for No. 2 cylinder.

In step 66, the control unit 30 corrects contents of spark timing register for No. 1 cylinder, No. 3 cylinder, No. 4 cylinder and No. 2 cylinder with individual correction amounts REIPA1, REIPA3, REIPA4 and REIPA2, respectively. Accordingly, ignition timing control reflecting these correction amounts is carried out. This causes alteration of individual cylinder torque in such a direction as to reduce deviation of individual cylinder average IPIMAn from multiple cylinder average IPIMAV.

Figure 3:
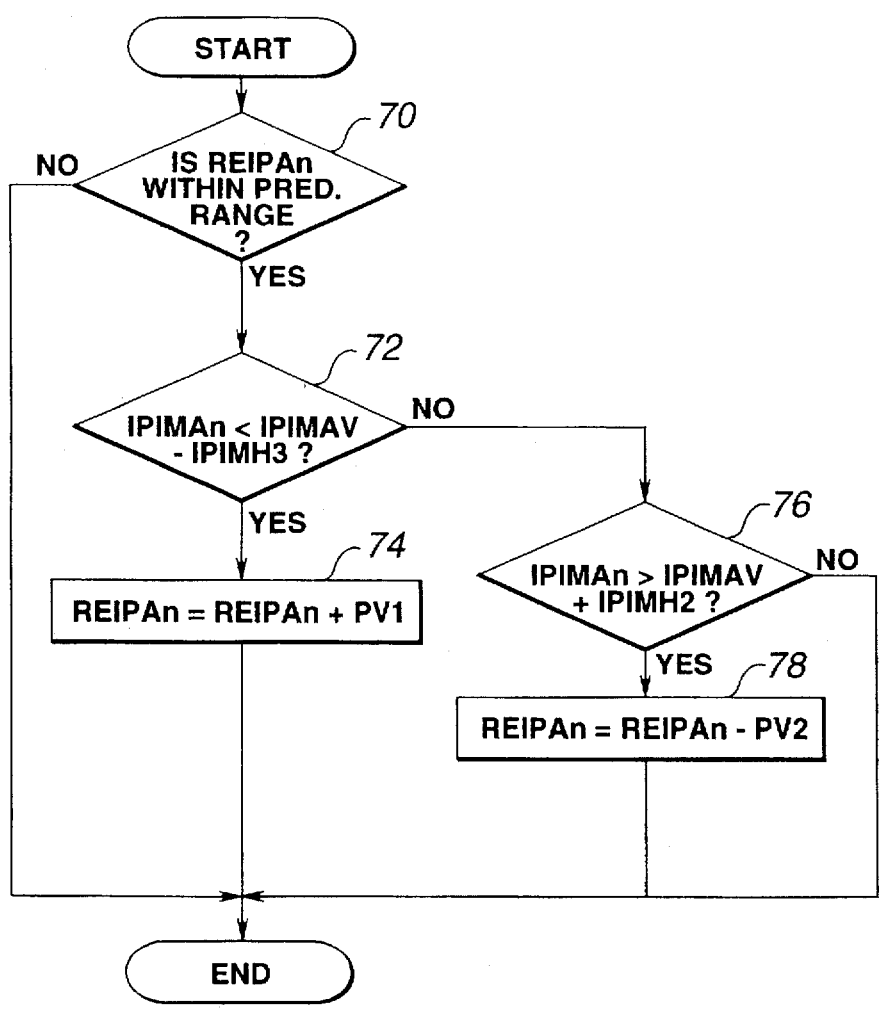
FIG. 3 is a flowchart of a sub-routine.

The flowchart of FIG. 3 illustrates a sub-routine which the control unit 30 executes in each of steps 58, 60, 62 and 64 in determining correction amounts REIPAn.

In FIG. 3, in step 70, the control unit 30 determines whether or not correction amount REPIAn falls in a predetermined range limited by upper and lower limits. If the correction amount falls outside of this predetermined range, the control unit 30 terminates execution of this sub-routine. Thus, inappropriate correction of the ignition timing is prohibited, thus preventing degradation of driveability and exhaust performance.

If the interrogation in step 70 results in affirmative, the control unit 30 determines, in step 72, whether or not individual cylinder average IPIMAn is less than (IPIMAV−IPIMH3), where; IPIMH3 is a predetermined value. If the interrogation in step 72 results in affirmative, the control unit 30 performs increment, in step 74, of correction amount REIPAn by a first predetermined value PV1 and terminates the sub-routine. If the interrogation in step 72 results in negative, the control unit 30 determines, in step 76, whether or not individual cylinder average IPIMAn is greater tan (IPIMAV+IPIMH2), where: IPIMH2 is another predetermined value. If the interrogation in step 76 results in affirmative, the control unit 30 performs decrement, in step 78, of correction amount REIPAn by a second predetermined value PV2 and terminates the sub-routine. If the individual cylinder average IPIMAn falls in a dead zone about IPIMAV, i.e., IPIMAV−IPIMH3<IPIMAn≦IPIMAV+IPIMH2, the interrogation in step 76 results in negative. In this case, the control unit 30 leaves the correction amount REIPAn unaltered and terminate the sub-routine. As may be readily understood from the above explanation of the flowchart of FIG. 3, increment of correction amount REIPAn in step 74 causes a change of ignition timing in a such direction as to cause an increase in developed torque by the cylinder. On the other hand, decrement of correction amount REIPAn in step 78 cause a change of ignition timing in the opposite direction, causing a decrease in developed torque by the cylinder. In this manner, developed torque by individual cylinders converge into the dead zone around the multiple cylinder average IPIMAV.

With the control discussed above, even if there are variations in stable combustion limit between individual cylinders, closed loop control of the individual cylinders toward their lean burn limits by altering ignition timing and or air fuel ration for each of the cylinders can be carried out without inducing any variation of torque among the cylinders. Thus, the engine can operate without any torque variation at very lean air fuel ration near combustion limit.

Figure 5:
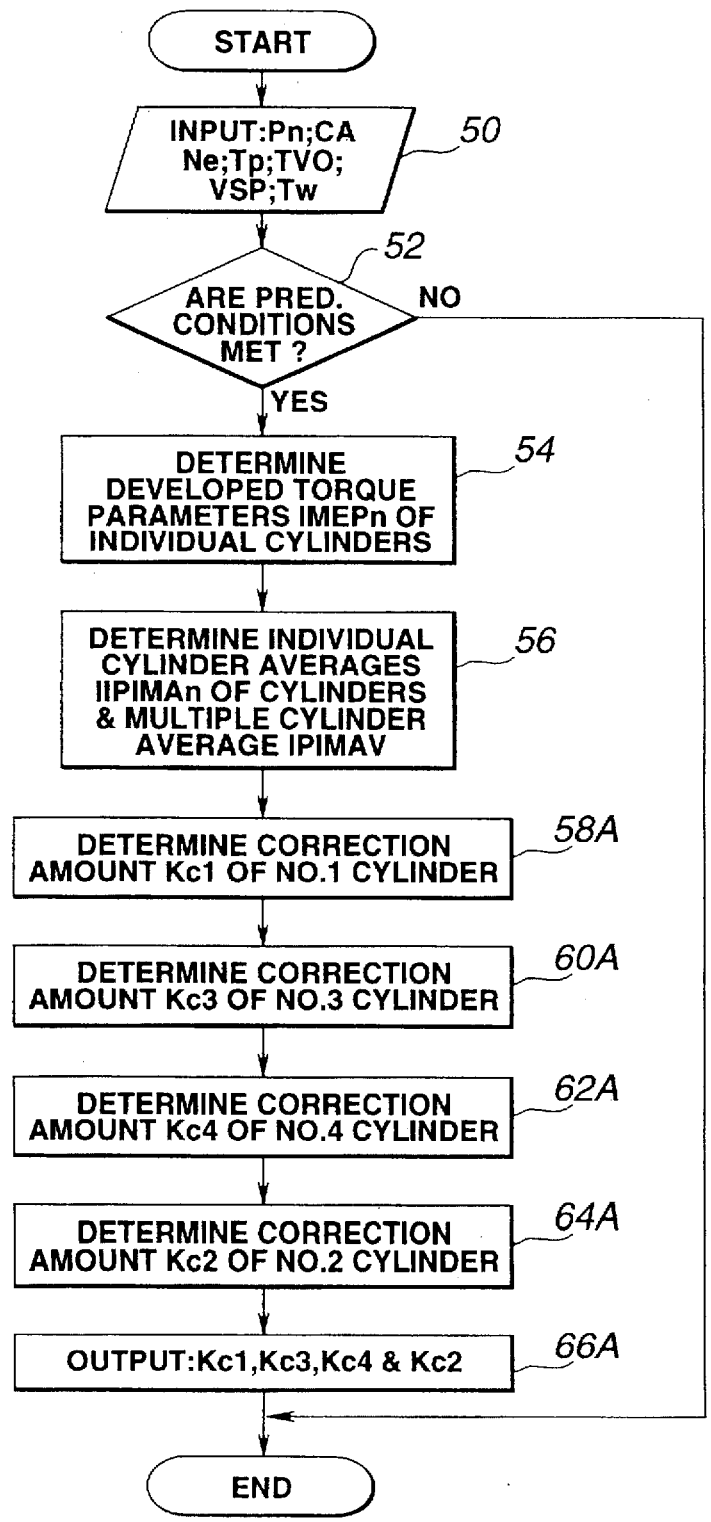
FIG. 5 is a flowchart of a main routine illustrating another preferred implementation of a control strategy according to the present invention.

The control according to the present invention can be conducted by effecting correction of fuel injection amount (air fuel ratio). The flowchart of FIG. 2 illustrates a routine of another preferred implementation of the present invention. According to this implementation, the fuel injection amount is corrected. The flowchart of FIG. 5 is substantially similar to that of FIG. 2 except that a step 58A which comes after step 56 and steps 60A, 62A, 64A and 66A.

With multiple cylinder average IPIMAV and individual cylinder average IPIMA1, the control unit 30 determines, in step 58A, a correction amount Kc1 to K1 (1 means No. 1 cylinder of base fuel injection amount Tp (see Eq. 3) for No. 1 cylinder.

With multiple cylinder average IPIMAV and individual cylinder average IPIMA3, the control unit 30 determines, in step 60A, a correction amount Kc3 to K3 (3 means No. 3 cylinder) of the base fuel injection amount Tp for No. 3 cylinder.

With multiple cylinder average IPIMAV and individual cylinder average IPIMA4, the control unit 30 determines, in step 62A, a correction amount Kc4 to K4 (4 means No. 4 cylinder) of the base fuel injection amount Tp for No. 4 cylinder.

With multiple cylinder average IPIMAV and individual cylinder average IPIMA2, the control unit 30 determines, in step 62A, a correction amount Kc2 to K2 (2 means No. 2 cylinder) of the base fuel injection amount Tp for No. 2 cylinder.

In step 66A, the control unit 30 corrects K1, K3, K4 and K2 with the correction amounts Kc1, Kc3, Kc4 and Kc2, respectively. Accordingly, fuel injection control reflecting these correction amounts is carried out. This causes alteration of individual cylinder torque in such a direction as to reduce deviation of individual cylinder average IPIMAn from multiple cylinder average IPIMAV.

Figure 6:
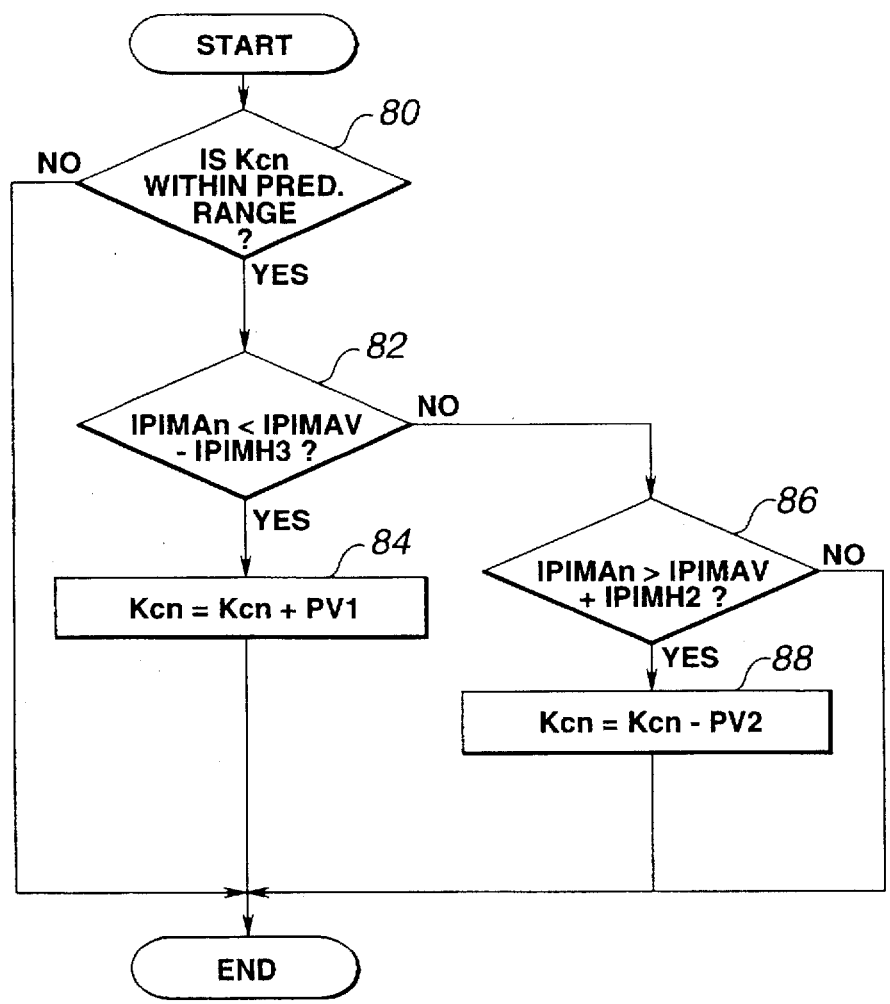
FIG. 6 is a flowchart of a sub-control routine.

The flowchart of FIG. 6 illustrates a sub-routine which the control unit 30 executes in each of steps 58A, 60A, 62A and 64A in determining correction amounts Kcn (n represents cylinder number, n=1, 2, 3, 4).

In FIG. 6, in step 80, the control unit 30 determines whether or not correction amount Kcn falls in a predetermined range limited by upper and lower limits. If the correction amount Kcn falls outside of this predetermined range, the control unit 30 terminates execution of this sub-routine.

If the interrogation in step 80 results in affirmative, the control unit determines, in step 82, whether or not individual cylinder average IPIMAn is less than (IPIMAV−IPIMH3). If the interrogation in step 82 results in affirmative, the control unit 30 performs increment, in step 84, of correction amount Kcn by a first predetermined value PV1 and terminates the sub-routine. If the interrogation in step 82 results in negative, the control unit 30 determines, in step 86, whether or not individual cylinder average IPIMAn is greater than (IPIMAV+IPIMH2). If the interrogation in step 86 results in affirmative, the control unit 30 performs decrement, in step 88, of correction amount Kcn by a second predetermined value PV2 and terminates the sub-routine.

If the individual cylinder average IPIMAn falls in a dead zone about IPIMAV, i.e., IPIMAV−IPIMH3<IPIMAn≦IPIMAV+IPIMH2, the interrogation in step 86 results in negative. In this case, the control unit 30 leaves the correction amount Kcn unaltered and terminates the sub-routine. As may be readily understood from the above explanation of the flowchart of FIG. 6, increment of correction amount Kcn in step 84 causes an increase in fuel injection amount, causing an increase in developed torque by the cylinder. On the other hand, decrement of correction amount Kcn in step 88 cause a decrease in fuel injection amount, causing a decrease in developed torque by the cylinder. In this manner, developed torque by individual cylinders converge into the dead zone around the multiple cylinder average IPIMAV.

Figure 7:
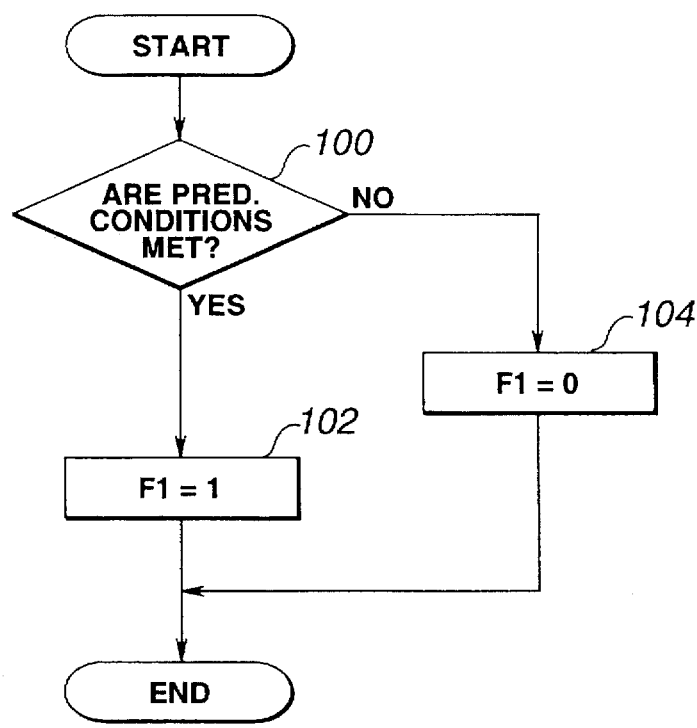
FIG. 7 is a flowchart illustrating a control permission flag setting routine for determining whether or not predetermined conditions are met.

The flowchart of FIG. 7 and that of FIGS. 8 to 16 illustrate routines of the preferred implementation of the present invention. In this example, the present invention is embodied for improved cylinder torque balance during idle engine operation.

In FIG. 7, in step 100, the control unit 30 determines whether or not predetermined conditions are met. If this is the case, the control unit 30 sets a control permission flag F1 in step 102. If not, the control permission flag F1 is reset to zero. Execution of this routine is repeated at regular intervals. Although not specifically illustrated in this flowchart, the control unit 30 determines that the predetermined conditions are met when a predetermined delay time (SSTDL) has past after a starter switch has been turned to OFF state from ON state, a predetermined delay time (IPALSD) has past after conditions for permitting idle speed closed-loop control has been met, and the predetermined delay IPALSD has past after a change in state of various switches, namely, an air conditioner switch, a power steering switch, a lamp switch.

Figure 8:
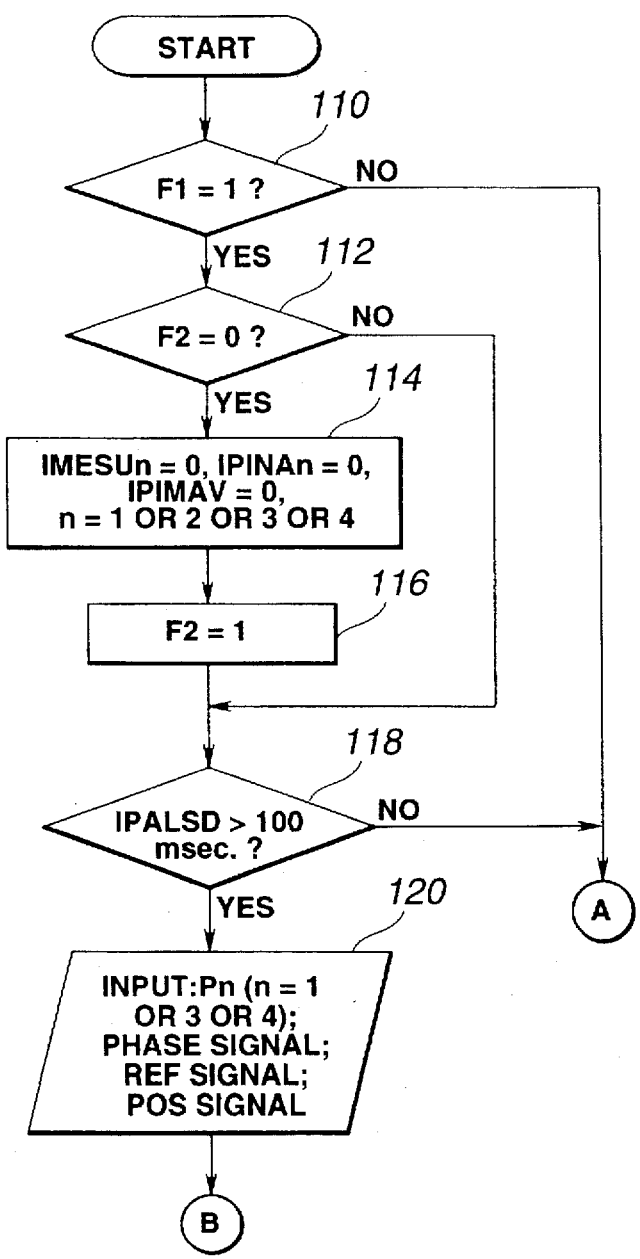
FIGS. 8 to 16 show a flowchart of a routine for cylinder torque balance during engine operation at idle speeds.
Figure 9:
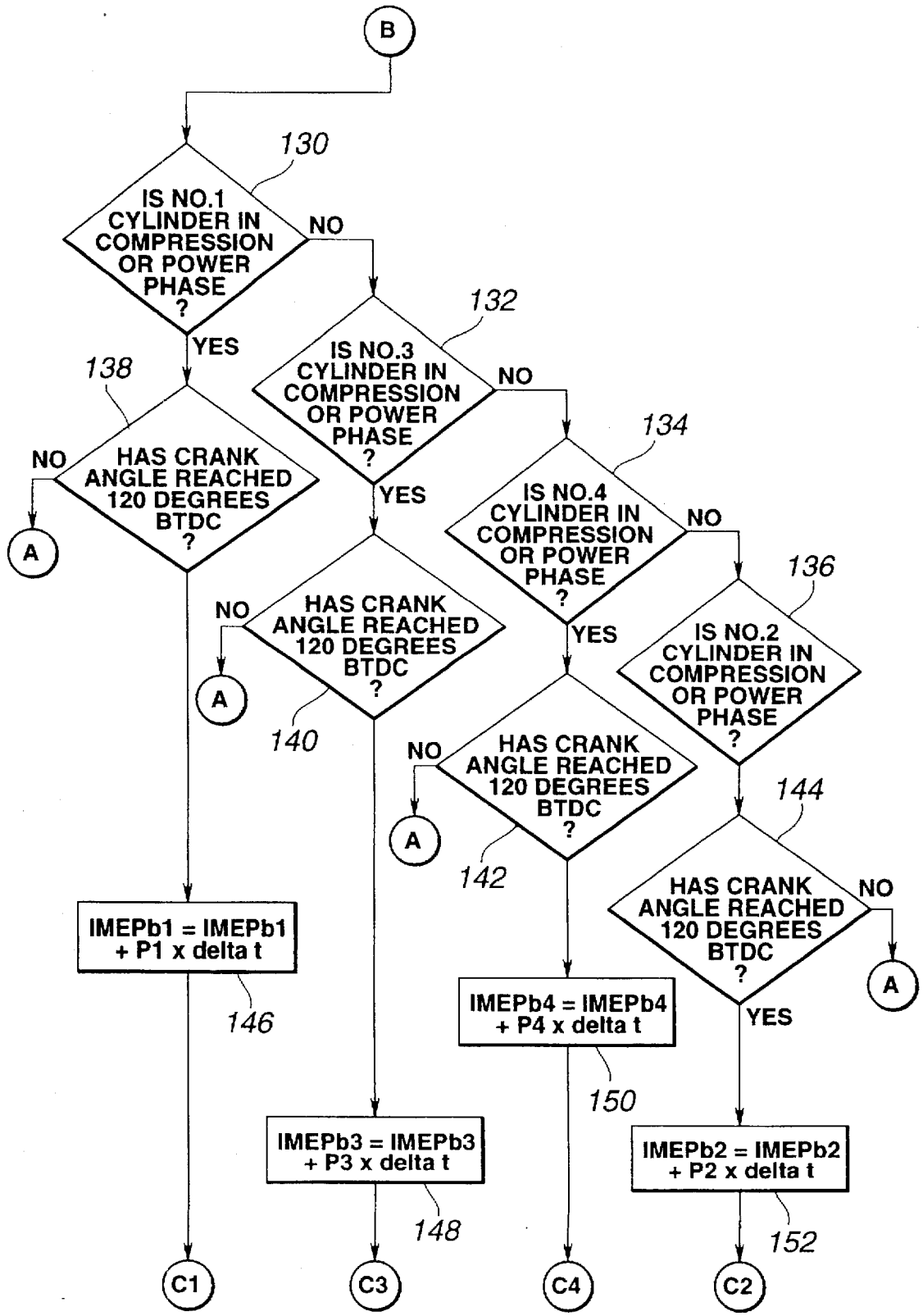
Figure 10:
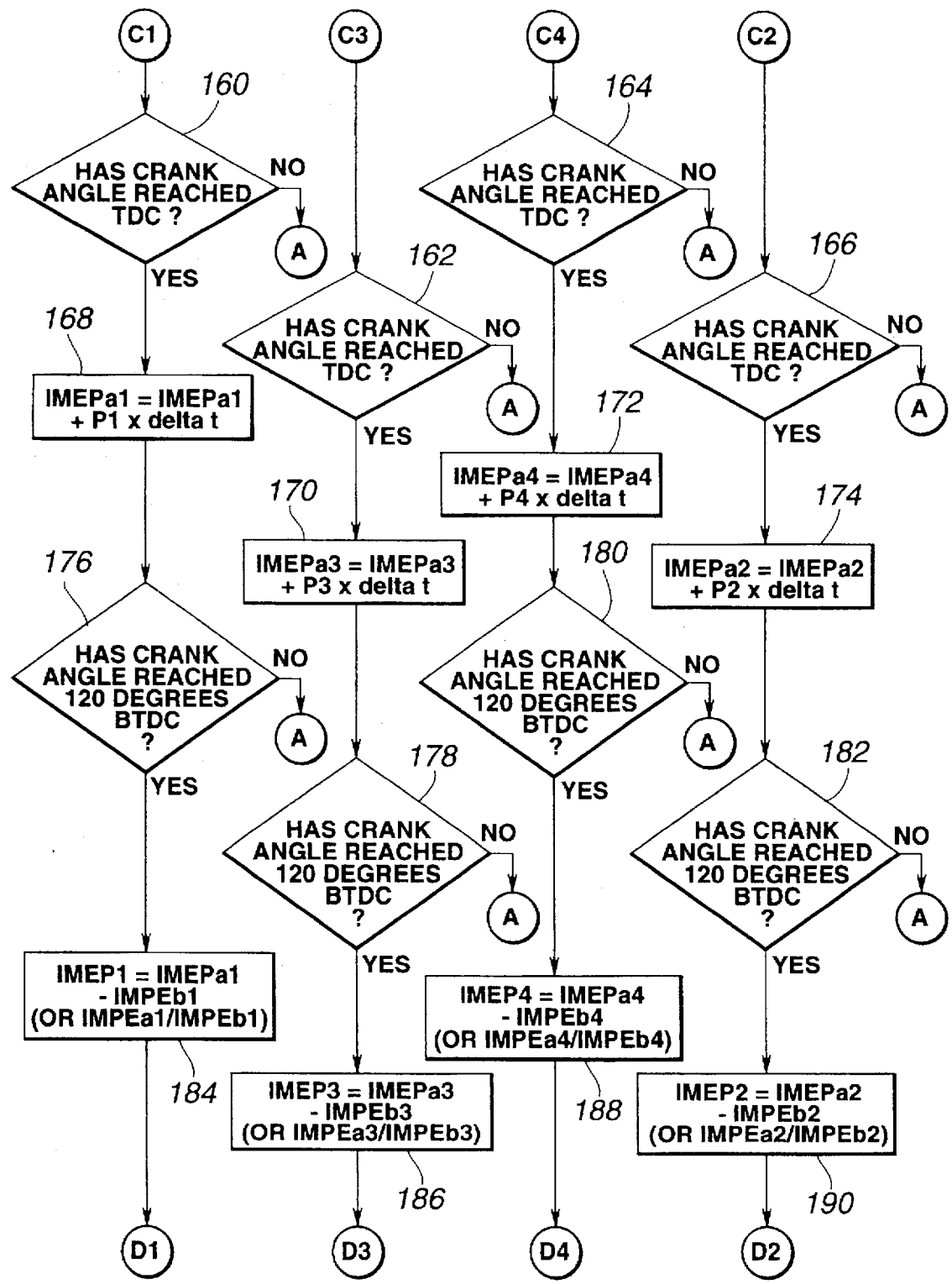

The state of the control permission flag F1 is checked in step 110 (see FIG. 8). In step 110 of FIG. 8, the control unit 30 determines whether or not the control permission flag F1 is set equal to 1. If this is the case, the control unit 30 proceeds along steps 112, 114 and 116 to reset IMESUn, IPINAn and IPIMAV once immediately after the control permission flag F1 has been set. If the interrogation in step 110 results in negative, the control unit 30 terminates execution of the routine.

Execution of the routine of FIGS. 8 to 16 is repeated at regular intervals, Δt (delta t).

In step 118 of FIG. 8, the control unit 30 determines whether or not another predetermined condition has been met for further arithmetic processing along step 120 and onwards. A timer IPALSD is started in step 332 (see FIG. 16) immediately after production of sparks at ignition timings as corrected by this control. The content of this timer is incremented in timed with clock of the computer and reset to zero each time it is started in step 332. In step 118, the control unit determines whether the content of timer IPALSD has exceeded 100 msec. If this is not the case, the control unit 30 terminates execution of this routine.

If the interrogation in step 118 results in affirmative, the control unit 30 inputs cylinder pressure signals Pn from pressure sensors 40 of individual cylinders, and PHASE, REF and POS signals from crank angle sensor 36.

The engine has four cylinders, namely, No. 1 cylinder, No. 2 cylinder, No. 3 cylinder and No. 4 cylinder, with firing order 1-3-4-2.

In steps 130, 132, 134 and 136, the control unit 30 determines which one of the cylinder is in compression or power phase or stroke based on the signals from the crank angle sensor 36. In steps 138, 140, 142 and 144, the control unit 30 determines whether or not crank angle has reached 120 degrees before top dead center (BTDC). If this is the case, the control unit 30 executes time integration of cylinder pressure Pn of the cylinder in step 146 or 148 or 150 or 152 over crank angles from 120 degrees BTDC to top dead center TDC to determine IMEPb1, IMEPb3, IMEPb4 and IMEPb2 for the corresponding cylinders, respectively.

In steps 160, 162, 164 and 166 (see FIG. 10), the control unit 30 determined one of the cylinders has reached TDC and initiates time integration of cylinder pressure Pn in step 168 or 170 or 172 or 174 to determine IMEPa1, IMEPa3, IMEPa4 and IMEPa2. In steps 176, 178, 180 and 182, the control unit 30 determines whether or not one of the cylinder has reached 120 degrees after top dead center (ATDC). In steps 184, 186, 188, 190, the control unit 30 determines IMEP1, IMEP3, IMEP4 and IMEP2 for the cylinders, respectively, by calculating equations illustrated in these steps.

Figure 11:
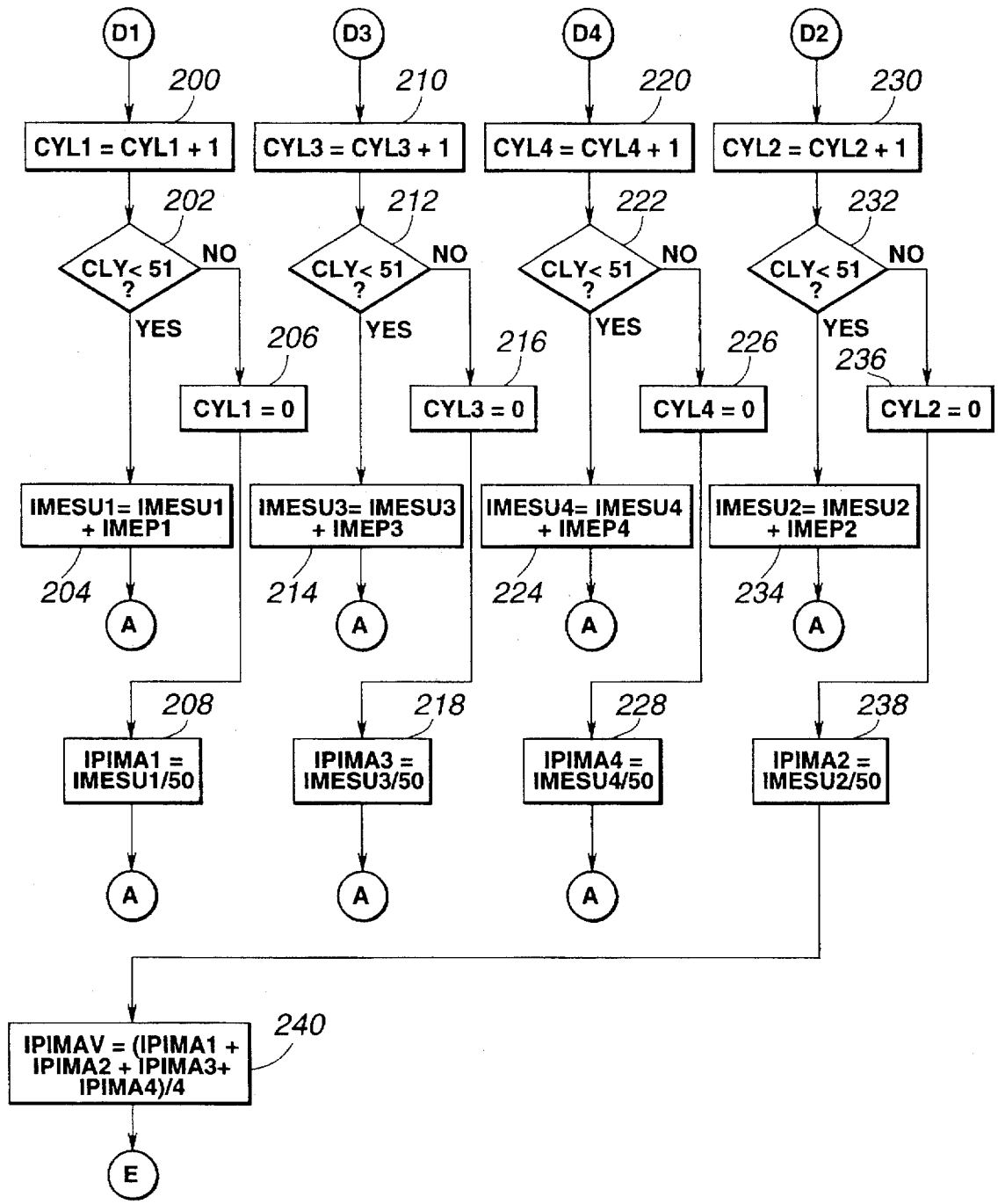

In this control, 50 samples of IMEPn are collected. In FIG. 11, in steps 200, 210, 220 and 230, the control unit 30 increments cycle counters CYL1, CYL3, CYL4 and CYL allocated to individual cylinders immediately after completion of calculations in steps 184, 186, 188 and 190, respectively. Integration IMESU1 of 50 samples of IMEP1 is made by repeating calculation in step 204 until cycle counter CYL1 reaches 51 in step 202 and then is rest to zero in step 206. After step 206, the control unit 30 calculates individual cylinder average IPIMA1 for No. 1 cylinder in step 208. Similarly, integration IMESU3 of 50 samples of IMEP3 is made by repeating calculation in step 214 until cycle counter CYL3 reaches 51 in step 212 and then is rest to zero in step 216. After step 216, the control unit 30 calculates individual cylinder average IPIMA3 for No. 3 cylinder in step 218. Integration IMESU4 of 50 samples of IMEP4 is made by repeating calculation in step 224 until cycle counter CYL4 reaches 51 in step 222 and then is rest to zero in step 226. After step 226, the control unit 30 calculates individual cylinder average IPIMA4 for No. 4 cylinder in step 228. Integration IMESU2 of 50 samples of IMEP4 is made by repeating calculation in step 234 until cycle counter CYL2 reaches 51 in step 232 and then is rest to zero in step 236. After step 236, the control unit 30 calculates individual cylinder average IPIMA2 for No. 2 cylinder in step 238.

After step 238, the control unit 30 proceeds to step 240. In step 240, the control unit 30 calculates multiple cylinder average IPIMAV based on the results of calculations in steps 208, 218, 228 and 238.

Figure 12:
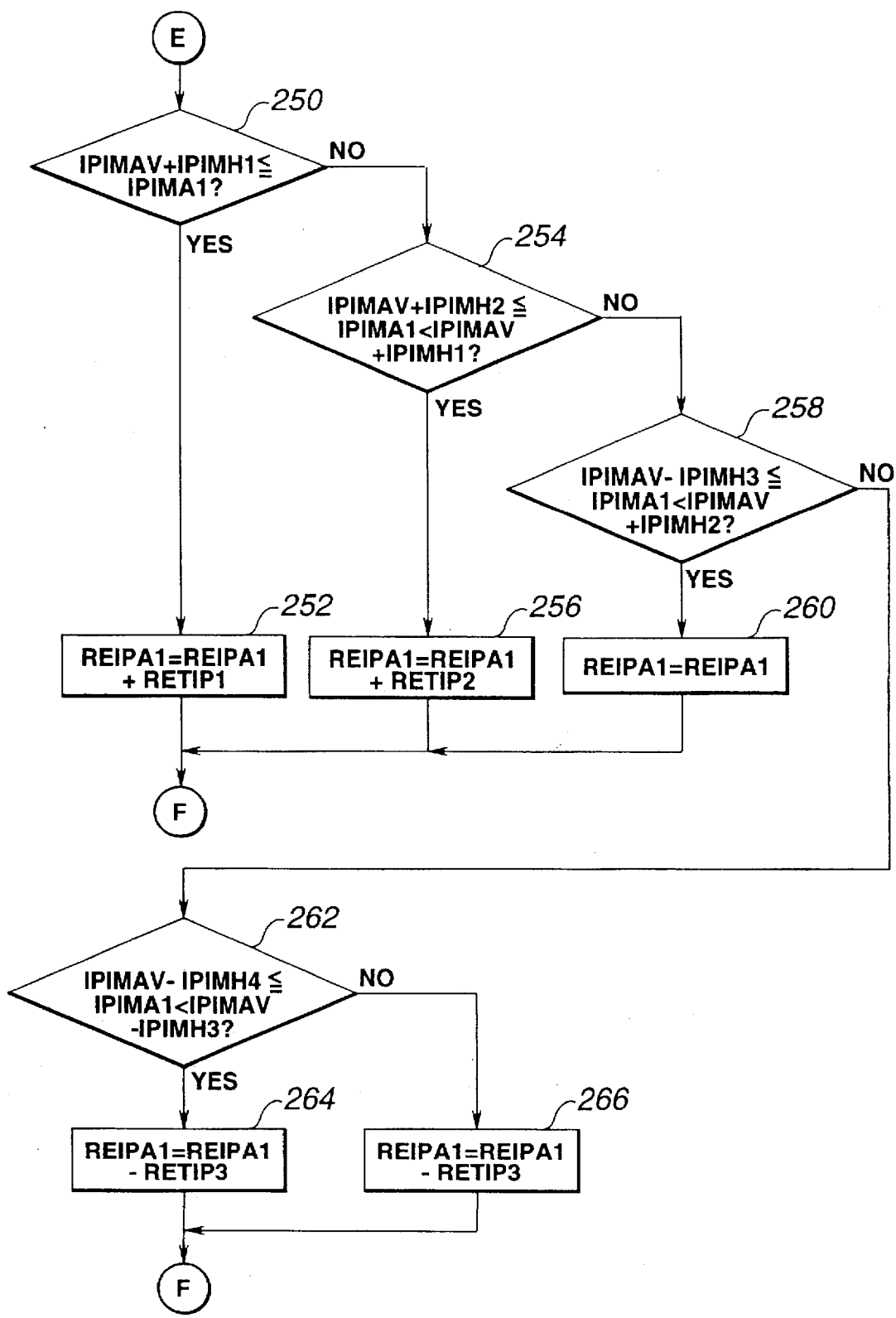
Figure 13:
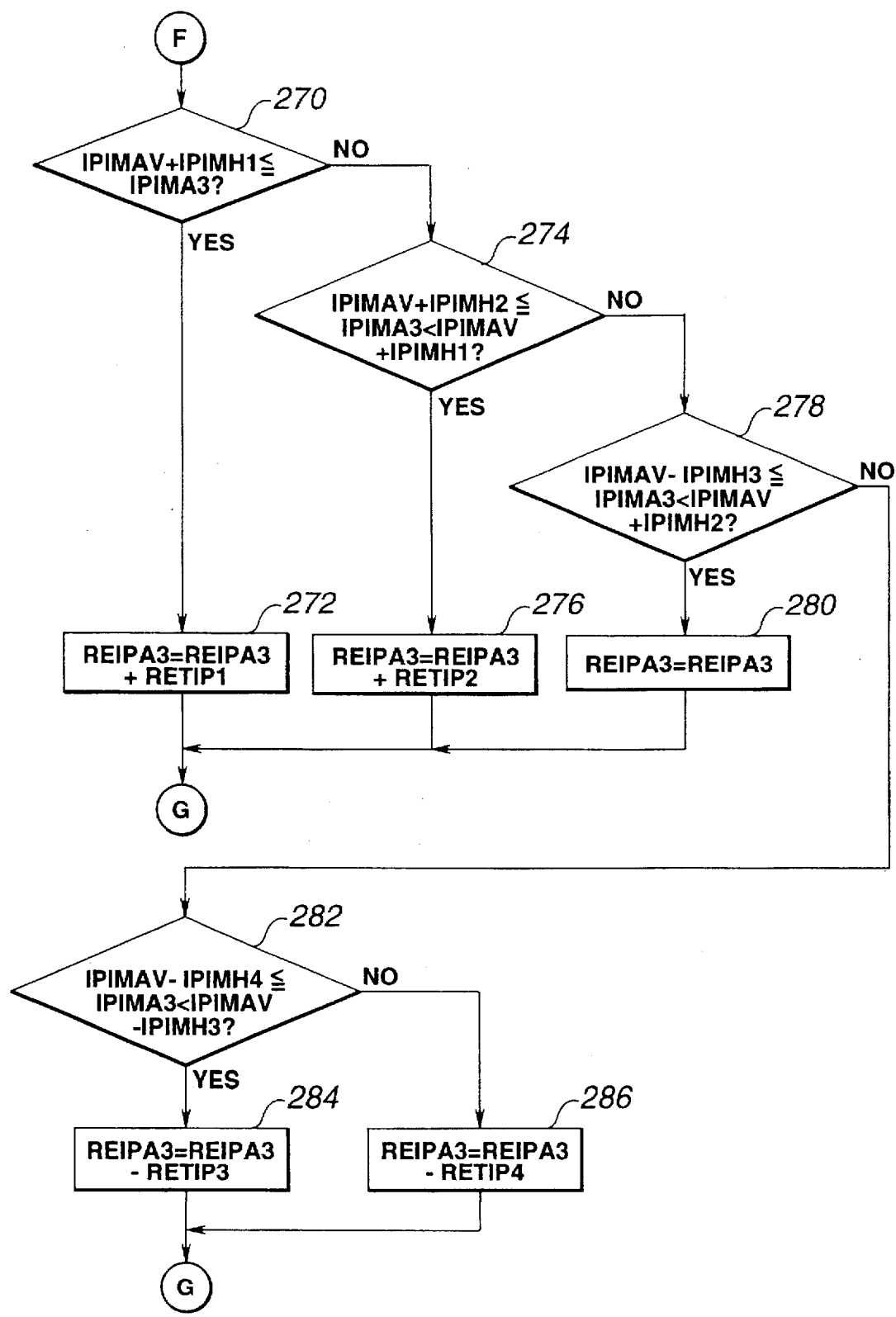
Figure 14:
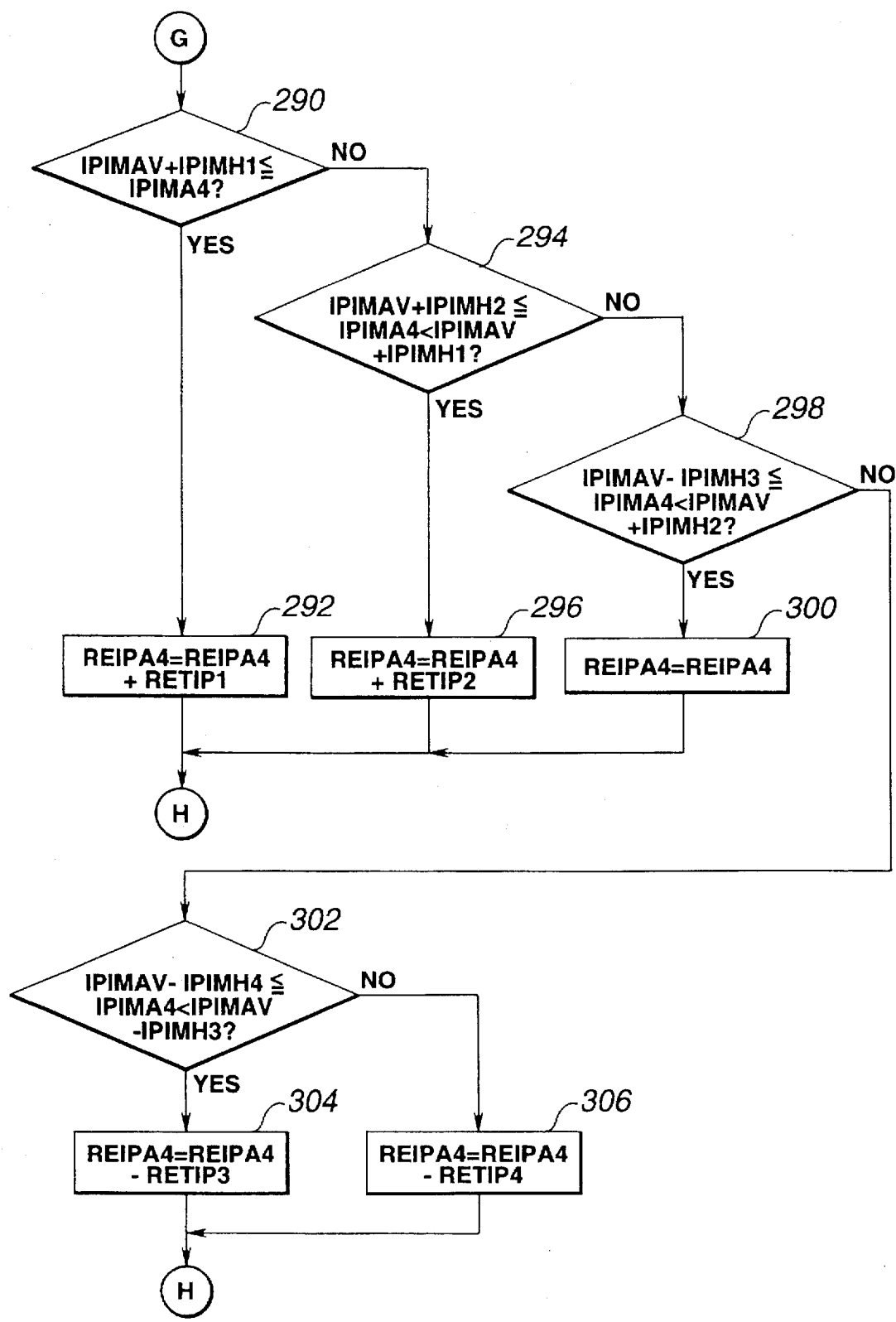
Figure 15:
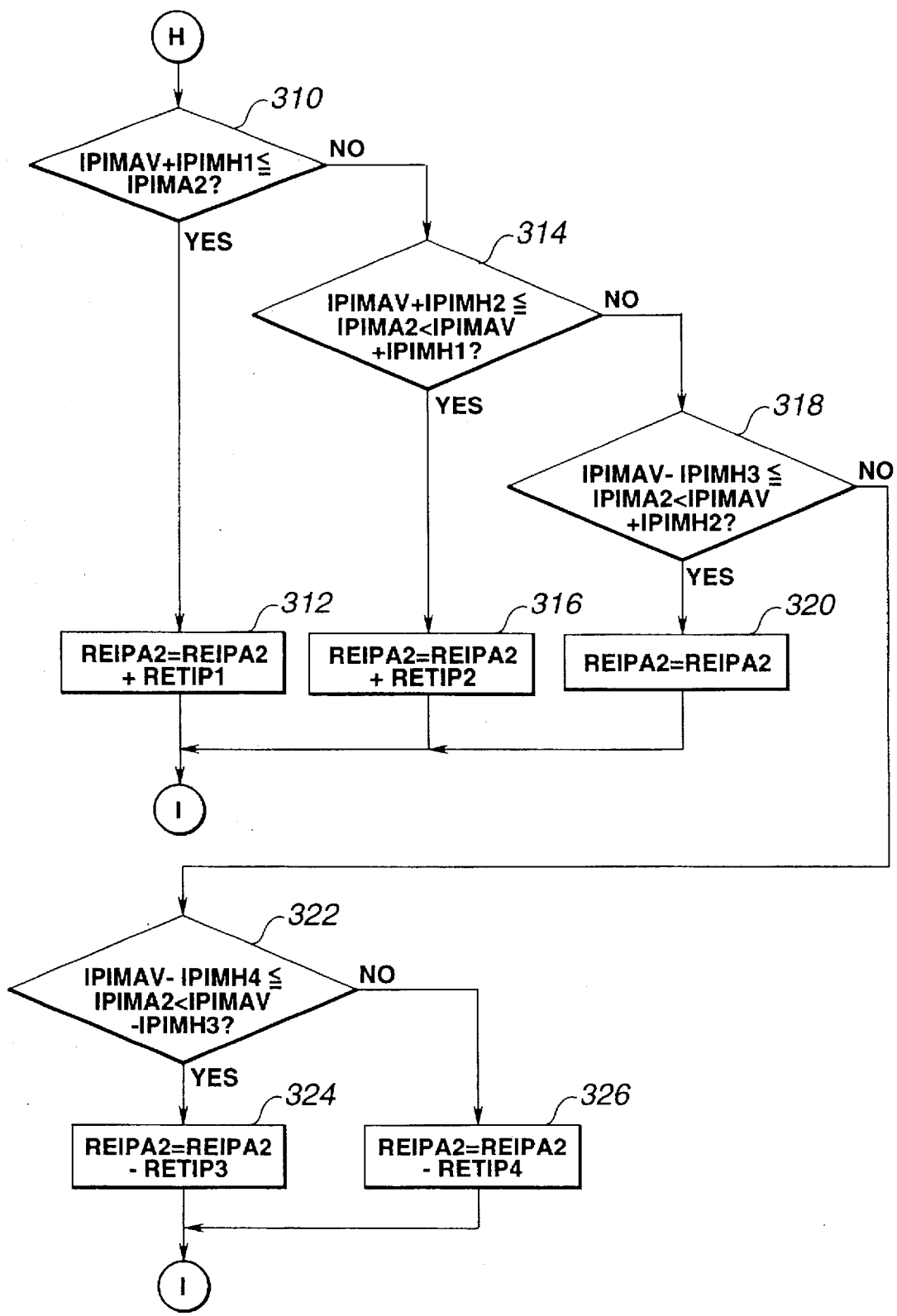

Portions of the flowchart shown in FIGS. 12, 13, 14 and 15 correspond to steps or blocks 58, 60, 62 and 64 of the flowchart of FIG. 2, respectively. In FIGS. 12, 13, 14 and 15, IPIMH1, IPIMH2, IPIMH3 and IPIMH4 are predetermined values. Among them, IPIMH1 is greater than IPIMH2, while IPIMH4 is greater than IPIMH3. FIG. 12 illustrates steps in which the control unit 30 compares individual cylinder average IPIMA1 of No. 1 cylinder with multiple cylinder average IPIMAV in steps 250, 254, 258 and 262 and determines correction amount REIPA1 for No. 1 cylinder in step 252 or 256 or 260 or 264 or 266 in response to the comparison result. In steps 252, 256, 264 and 266, RETIP1, ETIP2, RETIP3 and REIP4 represent predetermined angles, respectively. Similarly, correction amounts REIPA3, REIPA4 and REIPA2 for No. 3, 4 and 2 cylinders are determined by steps shown in FIGS. 13, 14 and 15.

Figure 16:
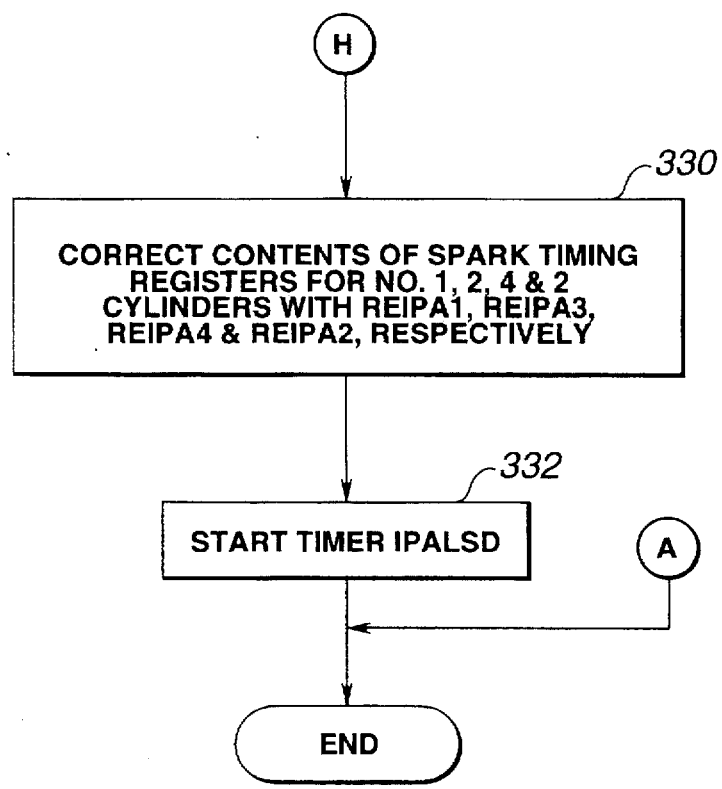

In FIG. 16, in step 330, the control unit 30 corrects contents of spark timing registers for No. 1, 3, 4 and 2 cylinders with the correction amounts REIPA1, REIPA3, REIPA4 and REIPA2, respectively. Then, in step 332, the control unit 30 reset to start timer IPALSD to prohibit sampling of data for a predetermined period of time of 100 msec. This is because there is delay until cylinder operation reaches stable state after correction of ignition timing.

What is claimed is:

1. A control system for cylinder torque balance of an internal combustion engine including multiple cylinders, comprising:

means for determining individual cylinder torque having been developed by the cylinders of the engine;

means for calculating, out of the determined individual cylinder torque, a multiple cylinder average; and means for controlling a control variable on which individual cylinder torque depends in such a manner as to decrease a deviation of the determined individual cylinder torque from the determined multiple cylinder average.

2. A control system as claimed in claim 1, wherein said determining means is operative to detect cylinder pressure from one to another of the cylinders and calculates a developed torque parameter out of the detected cylinder pressure for the one to another of the cylinders.

3. A control system as claimed in claim 2, wherein said determining means is operative to set as the developed torque parameter a deviation of integral of cylinder pressure over a predetermined crank angles before top dead center (BTDC) from integral of cylinder pressure over a predetermined crank angles after top dead center (ATDC).

4. A control system as claimed in claim 2, wherein said determining means is operative to set as the developed torque parameter a ratio between integral of cylinder pressure over a predetermined crank angles after top dead center (ATDC) and integral of cylinder pressure over a predetermined crank angles before top dead center (BTDC).

5. A control system as claimed in claim 1, wherein said controlling means is operative to adjust, as said control variable, a correction amount to fuel injection amount to individual cylinders.

6. A control system as claimed in claim 1, wherein said controlling means is operative to adjust, as said control variable, a correction amount to ignition timing for individual cylinders.

7. A control system as claimed in claim 1, wherein said controlling means is operative to set a predetermined range within which said control variable is allowed to be adjusted.

8. A control method for cylinder torque balance of an internal combustion engine including multiple cylinders, comprising the steps of:

determining individual cylinder torque having been developed by the cylinders of the engine;

calculating, out of the determined individual cylinder torque, a multiple cylinder average; and controlling a control variable on which individual cylinder torque depends in such a manner as to decrease a deviation of the determined individual cylinder torque from the determined multiple cylinder average.

9. In an ignition timing control system for an internal combustion engine including a plurality of spark plugs for cylinders of the engine, respectively, the plurality of spark plugs providing sparks in response to individual spark timing commands, and control unit means for developing the individual spark timing commands, the improvement wherein:

the control unit means inputs information of cylinder pressure within each of the engine cylinders over crank angles about top dead center (TDC) over a predetermined number of cycles;

the control unit means determines, for each of the cylinders, a ratio, as a developed torque parameter, between integral of cylinder pressure over a predetermined angle after top dead center and integral of cylinder pressure over a predetermined crank angle before top dead center;

the control unit means calculates integral of said determined developed torque parameter over said predetermined number of cycles and calculates an individual cylinder average for each of the cylinders;

the control unit means calculates a multiple cylinder average out of said individual cylinder averages of the cylinders;

the control unit means compares each of said individual cylinder averages with said multiple cylinder average; and the control unit means determines correction amounts to the ignition timing commands in response to results of comparing each of said individual cylinder averages with said multiple cylinder average, respectively.

10. In an ignition timing control system for an internal combustion engine including a plurality of spark plugs for cylinders of the engine, respectively, the plurality of spark plugs providing sparks in response to individual spark timing commands, and control unit means for developing the individual spark timing commands, the improvement wherein:

the control unit means inputs information of cylinder pressure within each of the engine cylinders over crank angles about top dead center (TDC) over a predetermined number of cycles;

the control unit means determines, for each of the cylinders, a deviation, as a developed torque parameter, between integral of cylinder pressure over a predetermined angle after top dead center and integral of cylinder pressure over a predetermined crank angle before top dead center;

the control unit means calculates integral of said determined developed torque parameter over said predetermined number of cycles and calculates an individual cylinder average for each of the cylinders;

the control unit means calculates a multiple cylinder average out of said individual cylinder averages of the cylinders;

the control unit means compares each of said individual cylinder averages with said multiple cylinder average; and the control unit means determines correction amounts to the ignition timing commands in response to results of comparing each of said individual cylinder averages with said multiple cylinder average, respectively.

11. An ignition timing control method for an internal combustion engine including a plurality of spark plugs for cylinders of the engine, respectively, the plurality of spark plugs providing sparks in response to individual spark timing commands, and control unit means for developing the individual spark timing commands, the method comprising the steps of:

inputting information of cylinder pressure within each of the engine cylinders over crank angles about top dead center (TDC) over a predetermined number of cycles;

determining, for each of the cylinders, a ratio, as a developed torque parameter, between integral of cylinder pressure over a predetermined angle after top dead center and integral of cylinder pressure over a predetermined crank angle before top dead center;

calculating integral of said determined developed torque parameter over said predetermined number of cycles and calculates an individual cylinder average for each of the cylinders;

calculating a multiple cylinder average out of said individual cylinder averages of the cylinders;

comparing each of said individual cylinder averages with said multiple cylinder average; and determining correction amounts to the ignition timing commands in response to results of comparing each of said individual cylinder averages with said multiple cylinder average, respectively.

12. An ignition timing control method for an internal combustion engine including a plurality of spark plugs for cylinders of the engine, respectively, the plurality of spark plugs providing sparks in response to individual spark timing commands, and control unit means for developing the individual spark timing commands, the method comprising the steps of:

inputting information of cylinder pressure within each of the engine cylinders over crank angles about top dead center (TDC) over a predetermined number of cycles;

determining, for each of the cylinders, a deviation, as a developed torque parameter, between integral of cylinder pressure over a predetermined angle after top dead center and integral of cylinder pressure over a predetermined crank angle before top dead center;

calculating integral of said determined developed torque parameter over said predetermined number of cycles and calculates an individual cylinder average for each of the cylinders;

calculating a multiple cylinder average out of said individual cylinder averages of the cylinders;

comparing each of said individual cylinder averages with said multiple cylinder average; and determining correction amounts to the ignition timing commands in response to results of comparing each of said individual cylinder averages with said multiple cylinder average, respectively.

* * * * *